(12) United States Patent
Dix et al.

(10) Patent No.: US 6,168,889 B1
(45) Date of Patent: Jan. 2, 2001

(54) BATTERY ELECTROLYTES AND BATTERIES

(75) Inventors: Eric R. Dix, Boise, ID (US); Weihong Li, North Ridgeville, OH (US)

(73) Assignee: Micron Technology, Inc., Boise, ID (US)

( * ) Notice: Under 35 U.S.C. 154(b), the term of this patent shall be extended for 0 days.

(21) Appl. No.: 09/209,218

(22) Filed: Dec. 10, 1998

(51) Int. Cl.⁷ ............................. H01M 6/24; H01M 10/08
(52) U.S. Cl. ...................... 429/322; 429/323; 429/326
(58) Field of Search ................................... 429/317, 307, 429/330, 331, 332, 333, 335, 322, 323, 326

(56) References Cited

U.S. PATENT DOCUMENTS

| | | | | |
|---|---|---|---|---|
| 5,272,022 | * | 12/1993 | Takami | 429/197 |
| 5,639,577 | * | 6/1997 | Takeuchi | 429/219 |
| 6,017,656 | * | 12/1993 | Crespi | 429/307 |
| 6,025,069 | * | 2/2000 | Hope | 429/317 |

OTHER PUBLICATIONS

Linden, D., *"Handbook of Batteries"*, Second Ed., pp. 36.13–36.16, No date available.

* cited by examiner

*Primary Examiner*—Maria Nuzzolillo
*Assistant Examiner*—Mark Ruthkosky
(74) *Attorney, Agent, or Firm*—Wells, St. John, Roberts, Gregory & Matkin, P. S.

(57) ABSTRACT

The invention encompasses battery electrolytes and batteries. In one aspect, the invention encompasses a battery electrolyte which includes the lithium salts, $LiN(CF_3SO_2)_2$, and $LiCF_3SO_3$ in a solvent blend comprising ethylene carbonate, propylene carbonate, and 1,2-dimethoxyethane. In another aspect, the invention encompasses a battery. The battery includes a first electrode, a second electrode, and an electrolyte between the first and second electrodes. The electrolyte comprises these lithium salts in a solvent blend comprising ethylene carbonate, propylene carbonate, and 1,2-dimethoxyethane. In yet another aspect, the invention encompasses another embodiment of a battery. The battery includes a cathode comprising at least one of $MnO_2$ and $(CF)_x$, and an anode comprising lithium. The battery further includes a non-aqueous electrolyte between the cathode and the anode. The non-aqueous electrolyte comprises the lithium salts in a solvent blend comprising ethylene carbonate, propylene carbonate, and 1,2-dimethoxyethane. The lithium salts comprise a mixture of $LiN(CF_3SO_2)_2$, and $LiCF_3SO_3$.

23 Claims, 1 Drawing Sheet

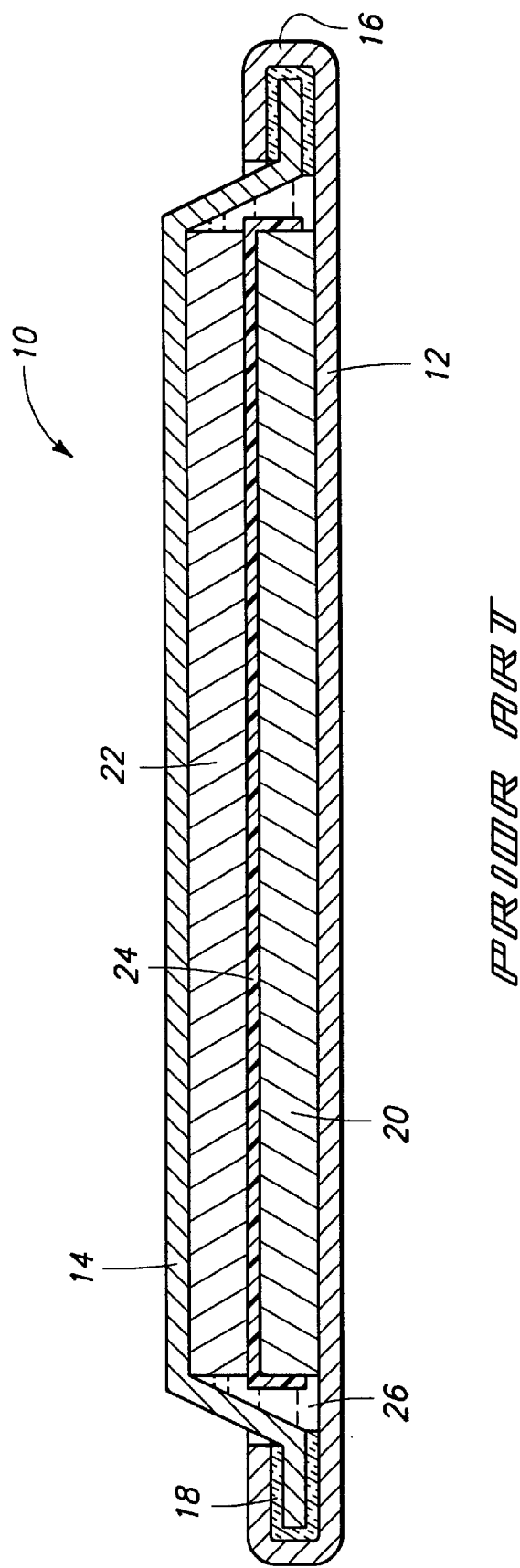

BATTERY ELECTROLYTES AND BATTERIES

TECHNICAL FIELD

The invention pertains to batteries and battery electrolyte.

BACKGROUND OF THE INVENTION

Small, thin lithium-anode batteries, such as button-type batteries, are commonly used in modern devices. For instance, button-type batteries are utilized as power sources for calculators and watches. Button batteries can be extremely thin (for example, button-batteries are sometimes produced to thickness of less than or equal to about 1 millimeter). A difficulty in forming batteries having thickness of 1 millimeter or less can be in maintaining good electrical transfer between the thin anode and the thin cathode of the battery. It can therefore be desired to develop new electrolyte compositions.

A prior art button-type battery 10 is shown in the FIGURE. Battery 10 comprises a lower terminal housing member, or can 12, and an upper terminal housing member, or lid 14. Can 12 and lid 14 are sealingly joined together at a crimp 16. Battery 10 is typically in the shape of a circle, with crimp 16 extending entirely around a periphery of the circle. A gasket material 18 is provided within crimp 16 to form a fluid-tight seal within the crimp. A cathode 20 and an anode 22 are provided between terminal housing members 12 and 14. Cathode 20 and anode 22 are separated by a porous separator 24. An electrolyte 26 is provided within the battery and within porous separator 24.

Battery anode 22 typically comprises lithium, and battery cathode 20 typically comprises a mixture of an active material and a conductive medium, or diluent. The active material can be, for example at least one of manganese dioxide and $(CF)_x$. The manganese dioxide provides a source of oxidizing component in a battery cell. As manganese dioxide is itself a poor conductor, the conductive medium is added to provide electrical conductivity. The conductive medium can be, for example, elemental carbon. The elemental carbon is typically in the form of graphite, although other materials, such as, acetylene black can also be used. Natural graphites can be used in alkaline cells, but typically cells are made with very pure synthetic graphite to reduce impurities which might lead to corrosion in a battery cell.

The choice of electrolyte for lithium batteries is "critical", (D. Linden, *Handbook of Batteries*, (1995) McGraw-Hill, Inc. at p. 36.13). The electrolyte should have characteristics of (1) ionic conductivity of greater than $10^{-3}$ S/cm at from $-40°$ C. to $90°$ C. to minimize internal resistance, (2) a lithium ion transference number approaching unity to limit concentration polarization, (3) a wide electrochemical voltage window of from 0 volts to 5 volts, (4) thermal stability up to $90°$ C., and (5) compatibility with other cell components.

It can be extremely difficult to develop good electrolytes for lithium batteries. Electrolyte chemistry is highly unpredictable, with electrolyte mixtures of similar composition have markedly different electrolytic properties. The search for good electrolytes is thus a tedious process wherein even minor adjustments to composition can constitute critical changes having significant impact on electrolytic properties. In spite of the difficulty of finding good electrolytes, the importance of electrolyte chemistry to battery life and performance requires that the search continue for additional good electrolytes. It would therefore be desirable to develop additional electrolytes for lithium batteries.

SUMMARY OF THE INVENTION

The invention encompasses battery electrolytes and batteries.

In one aspect, the invention encompasses a battery electrolyte which includes lithium salts comprising at least two salts selected from the group consisting of $LiN(CF_3SO_2)_2$, $LiAsF_6$, $LiBF_4$, $LiPF_6$ and $LiCF_3SO_3$ in a solvent blend comprising ethylene carbonate, propylene carbonate, and 1,2-dimethoxyethane.

In another aspect, the invention encompasses a battery. The battery includes a first electrode, a second electrode, and an electrolyte between the first and second electrodes. The electrolyte comprises lithium salts in a solvent blend comprising ethylene carbonate, propylene carbonate, and 1,2-dimethoxyethane. The lithium salts comprise at least two salts selected from the group consisting of $LiN(CF_3SO_2)_2$, $LiAsF_6$, $LiBF_4$, $LiPF_6$ and $LiCF_3SO_3$.

In yet another aspect, the invention encompasses another embodiment of a battery. The battery includes a cathode comprising at least one of $MnO_2$ and $(CF)_x$, and an anode comprising lithium. The battery further includes a non-aqueous electrolyte between the cathode and the anode. The non-aqueous electrolyte comprises lithium salts in a solvent blend comprising ethylene carbonate, propylene carbonate, and 1,2-dimethoxyethane. The lithium salts comprise at least two salts selected from the group consisting of $LiN(CF_3SO_2)_2$, $LiAsF_6$, $LiBF_4$, $LiPF_6$ and $LiCF_3SO_3$.

BRIEF DESCRIPTION OF THE DRAWING

Preferred embodiments of the invention are described below with reference to the following accompanying drawing.

The FIGURE is a diagrammatic cross-sectional view of a prior art button-type battery.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention encompasses battery electrolytes and batteries. Specifically, the invention encompasses a class of electrolytic compositions found to be particularly useful for enhancing discharge performance of lithium-containing cells. The electrolytes are found to be capable of improving both low and high temperature performance of battery cells.

The electrolytic compositions of the present invention were found by conducting a search of the electrolytic properties manifested by combinations of currently known lithium-containing electrolytic salts and various solvents. The particular solvents chosen were non-aqueous solvents, including, ethylene carbonate, propylene carbonate, 1,2-dimethoxyethane, and 2-methyltetrahydrofuran. The lithium-containing salts included $LiAsF_6$, $LiBF_4$, $LiCF_3SO_3$, $LiClO_4$, $LiN(CF_3SO_2)_2$ and $LiPF_6$. As electrolytic properties of various compositions cannot be reasonably predicted, literally hundreds of compositions of lithium salts and various solvents were tested to ascertain the electrolytic properties of the salt/solvent compositions. The testing was conducted based on a lithium anode/$MnO_2$ cathode electrode couple. The screening tests included ionic conductivity measurements, thermal stability measurements, discharge performance evaluation, and elevated temperature storage characterizations based on a 3.0 volt Li/MnO$_2$ electrode couple. Electrolyte oxidation/reduction screening was not performed during the investigation, as the electrolyte components included in the compositions are reported to be stable in a voltage window for 3.0 volt Li/MnO$_2$ cells.

Through the extensive investigations, a group of electrolytic compositions were found which offer superior discharge performance over a wide temperature range. Specifically, the electrolytic compositions have conductivities in a range of from about 2 mS/cm to about 20 mS/cm, and that which are maintained over a temperature range of from about −30° C. to about 90° C. The low temperature discharge properties of the electrolytic compositions of the present invention are particularly noteworthy. Such low temperature discharge properties car enable electrolytic compositions of the present invention to be utilized in batteries under low temperature conditions that would be considered too extreme for prior art electrolytic compositions.

The particular electrolytic compositions found by the screening process to have exceptional electrolytic properties contained lithium salts within a solvent blend comprising ethylene carbonate, propylene carbonate and 1,2-dimethoxyethane. Specifically, the electrolytic compositions preferably comprised from about 0.5M to about 2M of the lithium salts, from about 12.5% to about 25% of the ethylene carbonate, from about 12.5% to about 25% of the propylene carbonate, and from about 50% to about 77% of the 1,2-dimethoxyethane (wherein the percentages are by weight). A most preferred composition contained 0.7M LiN(CF$_3$SO$_2$)$_2$ and 0.3M LiCF$_3$SO$_3$, within a solvent blend comprising 25% ethylene carbonate, 25% propylene carbonate, and 50% 1,2-dimethoxyethane. It was also found that incorporation of a small amount of 2-methyltetrahydrofuran into a solvent blend could be beneficial. Specifically, it was found that electrolytic compositions comprising from about 0.5M to about 2M of lithium salts, from about 12.5% to about 25% of ethylene carbonate, from about 7.5% to about 25% of propylene carbonate, from about 25% to about 70% of 1,2-dimethoxyethane, and from about 25% to about 70% of 2-methyltetrahydrofuran could also have good electrolytic properties. In exemplary embodiments, the solvent blend can consist essentially of ethylene carbonate, propylene carbonate and 1,2-dimethoxyethane, or can consist essentially of ethylene carbonate, propylene carbonate, 1,2-dimethoxyethane and 2-methyltetrahydrofuran.

The electrolytic compositions described above can be incorporated into batteries, such as the prior art battery shown in the FIGURE. The electrolytic compositions of the present invention preferably remain non-aqueous when incorporated into a battery. By keeping the electrolytic compositions non-aqueous, water-mediated corrosion of a lithium anode can be alleviated or prevented. As the above-discussed screening has identified the electrolytic compositions of the present invention to have superior properties relative to other electrolytic compositions, incorporation of electrolytic compositions of the present invention into batteries can enable the batteries to have better performance features than would be achieved utilizing prior art electrolytic compositions.

In compliance with the statute, the invention has been described in language more or less specific as to structural and methodical features. It is to be understood, however, that the invention is not limited to the specific features shown and described, since this means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A battery electrolyte comprising lithium salts in a solvent blend comprising ethylene carbonate, propylene carbonate, and 1,2-dimethoxyethane; the lithium salts consisting essentially of LiN(CF$_3$SO$_2$)$_2$ and LiCF$_3$SO$_3$.

2. The battery electrolyte of claim 1 further being non-aqueous.

3. The battery electrolyte of claim 1 wherein the solvent blend consists essentially of ethylene carbonate, propylene carbonate, and 1,2-dimethoxyethane.

4. The battery electrolyte of claim 1 further comprising from 0.5M to 2M of the lithium salts; from 12.5% to 25% of the ethylene carbonate; from 12.5% to 25% of the propylene carbonate; and from 50% to 77% of the 1,2-dimethoxyethane; wherein the percentages are by weight.

5. The battery electrolyte of claim 1 further comprising from 0.5M to 2M of the lithium salts; from 12.5% to 25% of the ethylene carbonate; from 7.5% to 25% of the propylene carbonate; from 25% to 70% of the 1,2-dimethoxyethane; and further comprises from 25% to 70% of 2-methyltetrahydrofuran; wherein the percentages are by weight.

6. The battery electrolyte of claim 1 further comprising:
   about 0.7M of the LiN(CF$_3$SO$_2$)$_2$;
   about 0.3M of the LiCF$_3$SO$_3$;
   about 25% of the ethylene carbonate;
   about 25% of the propylene carbonate; and
   about 50% of the 1,2-dimethoxyethane; wherein the percentages are by weight.

7. A battery comprising:
   a first electrode;
   a second electrode; and
   an electrolyte between the first and second electrodes; the electrolyte comprising lithium salts in a solvent blend comprising ethylene carbonate, propylene carbonate, and 1,2-dimethoxyethane; the lithium salts consisting essentially of LiN(CF$_3$SO$_2$)$_2$ and LiCF$_3$SO$_3$.

8. The battery of claim 7 having a thickness of less than or equal to about 1 millimeter.

9. The battery of claim 7 wherein the solvent blend consists essentially of ethylene carbonate, propylene carbonate, and 1,2-dimethoxyethane.

10. The battery of claim 7 further comprising from 0.5M to 2M of the lithium salts; from 12.5% to 25% of the ethylene carbonate; from 12.5% to 25% of the propylene carbonate; and from 50% to 77% of the 1,2-dimethoxyethane; wherein the percentages are by weight.

11. The battery of claim 7 further comprising from 0.5M to 2M of the lithium salts; from 12.5% to 25% of the ethylene carbonate; from 7.5% to 25% of the propylene carbonate; from 25% to 70% of the 1,2-dimethoxyethane; and further comprises from 25% to 70% of 2-methyltetrahydrofuran; wherein the percentages are by weight.

12. The battery of claim 7 further comprising:
   about 0.7M of the LiN(CF$_3$SO$_2$)$_2$;
   about 0.3M of the LiCF$_3$SO$_3$;
   about 25% of the ethylene carbonate;
   about 25% of the propylene carbonate; and
   about 50% of the 1,2-dimethoxyethane; wherein the percentages are by weight.

13. The battery of claim 7 wherein one of the electrodes comprises lithium.

14. The battery of claim 7 wherein the first electrode is a cathode comprising at least one of $MnO_2$ and $(CF)_x$.

15. The battery of claim 7 wherein the second electrode is an anode comprising lithium.

16. The battery of claim 7 wherein the first electrode is a cathode comprising at least one of $MnO_2$ and $(CF)_x$ and the second electrode is an anode comprising lithium.

17. A battery comprising:
   a cathode comprising at least one of $MnO_2$ and $(CF)_x$;
   an anode comprising lithium; and
   a non-aqueous electrolyte between the cathode and the anode; the non-aqueous aqueous electrolyte comprising a mixture of lithium salts consisting essentially of $LiN(CF_3SO_2)_2$ and $LiCF_3SO_3$, the lithium salts being in a solvent blend comprising ethylene carbonate, propylene carbonate, and 1,2-dimethoxyethane.

18. The battery of claim 17 having a thickness of less than or equal to about 1 millimeter.

19. The battery of claim 17 wherein the solvent blend consists essentially of ethylene carbonate, propylene carbonate, and 1,2-dimethoxyethane.

20. The battery of claim 17 wherein the anode consists essentially of lithium.

21. The battery of claim 17 further comprising from 0.5M to 2M of the lithium salts; from 12.5% to 25% of the ethylene carbonate; from 12.5% to 25% of the propylene carbonate; and from 50% to 77% of the 1,2-dimethoxyethane; wherein the percentages are by weight.

22. The battery of claim 17 further comprising from 0.5M to 2M of the lithium salts; from 12.5% to 25% of the ethylene carbonate; from 7.5% to 25% of the propylene carbonate; from 25% to 70% of the 1,2-dimethoxyethane; and further comprises from 25% to 70% of 2-methyltetrahydrofuran; wherein the percentages are by weight.

23. The battery of claim 17 the battery electrolyte further comprising:
   about 0.7M of the $LiN(CF_3SO_2)_2$;
   about 0.3M of the $LiCF_3SO_3$;
   about 25% of the ethylene carbonate;
   about 25% of the propylene carbonate; and
   about 50% of the 1,2-dimethoxyethane; wherein the percentages are by weight.

* * * * *

UNITED STATES PATENT AND TRADEMARK OFFICE
CERTIFICATE OF CORRECTION

PATENT NO. : 6,168,889 B1
DATED : January 2, 2001
INVENTOR(S) : Weihong Li et al.

Page 1 of 1

It is certified that error appears in the above-identified patent and that said Letters Patent is hereby corrected as shown below:

Column 1,
Line 5, replace "electrolyte" with -- electrolytes --.

Column 3,
Line 15, replace " car" with -- can --.

Signed and Sealed this

Sixteenth Day of October, 2001

Attest:

NICHOLAS P. GODICI
Attesting Officer
Acting Director of the United States Patent and Trademark Office